(No Model.)
2 Sheets—Sheet 1.
G. E. MOSER.
CHURN.
No. 599,723.
Patented Mar. 1, 1898.
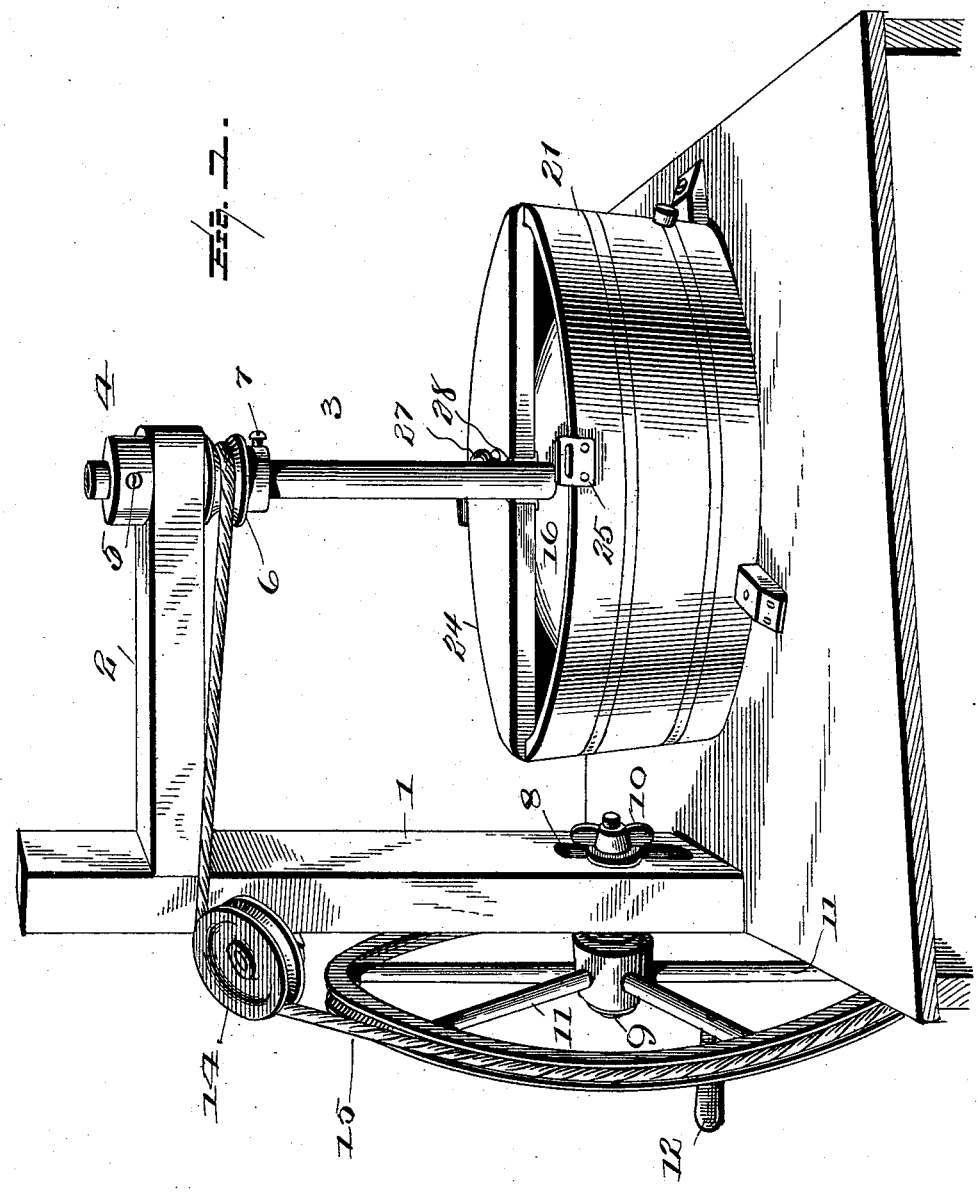
Witnesses:
L. C. Hills
W. A. Roberts
Inventor:
George E. Moser,
By Glascock & co.
Attys.

(No Model.) 2 Sheets—Sheet 2.
G. E. MOSER.
CHURN.
No. 599,723. Patented Mar. 1, 1898.
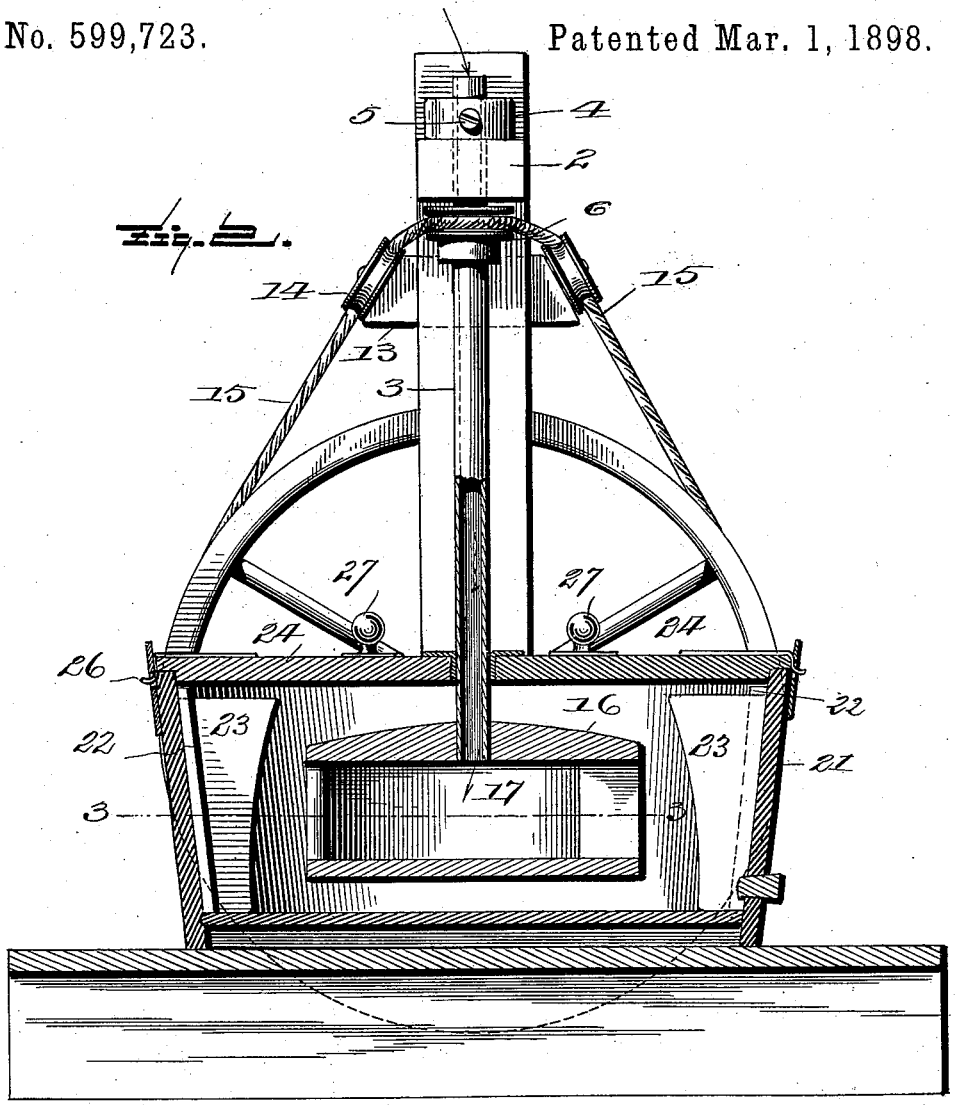
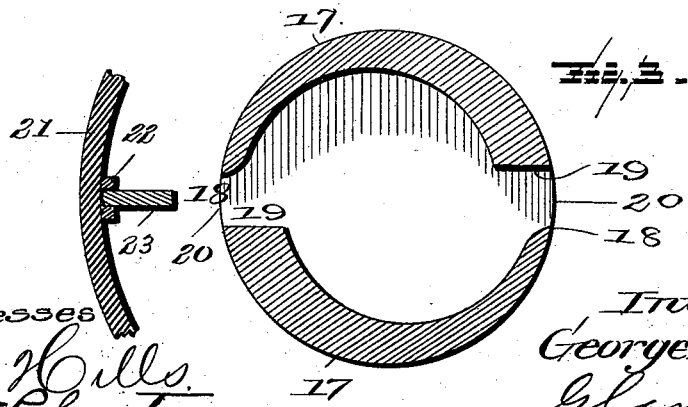
Witnesses
L. C. Hills.
W. A. Roberts.
Inventor:
George E. Moser,
By Glascock & Co.
Attys.
THE NORRIS PETERS CO., PHOTO-LITHO., WASHINGTON, D. C.

UNITED STATES PATENT OFFICE.

GEORGE E. MOSER, OF ALTOONA, PENNSYLVANIA, ASSIGNOR OF ONE-HALF TO GEORGE W. RHINE, OF SAME PLACE.

CHURN.

SPECIFICATION forming part of Letters Patent No. 599,723, dated March 1, 1898.

Application filed April 22, 1897. Serial No. 633,217. (No model.)

*To all whom it may concern:*

Be it known that I, GEORGE E. MOSER, a citizen of the United States, residing at Altoona, in the county of Blair and State of Pennsylvania, have invented a certain new, useful, and valuable Improvement in Churns, of which the following is a full, clear, and exact description.

My invention has relation to churns; and it consists in the novel construction and arrangement of its parts, as hereinafter described.

The object of my invention is to provide a simple and cheap churn that is adapted to force a current of air beneath the surface of the cream during the process of churning.

A further object of my invention is to relieve the bottom of the tub containing the cream from any unnecessary weight by journaling a dasher in an arm extending above the tub.

In the accompanying drawings, Figure 1 is a perspective view of the churn. Fig. 2 is a transverse sectional view of the tub and dasher. Fig. 3 is a horizontal sectional view of the dasher and a portion of the side of the tub.

The upright 1 is fixed at its lower end to a stationary point. The arm 2 extends horizontally from the upright 1. The hollow shaft 3 is journaled in the outer end of the arm 2, said shaft 3 adapted to slide perpendicularly within its bearing in the arm 2 and to retain the said shaft 3 in its proper position in the bearing of the arm 2. The upper end of the shaft 3 is provided with a collar 4, said collar adapted to be secured by means of a set-screw 5 to the said shaft 3. The pulley-wheel 6 is loosely mounted on the shaft 3 below the arm 2, said pulley 6 being held in its proper place on the shaft 3 by means of a set-screw 7.

The lower part of the upright 1 is provided with an elongated perforation 8. The shank of the spindle 9 passes through said perforation 8, and said shank is secured in its proper position in the perforation 8 by means of a thumb-nut and washer 10, as shown in Fig. 1. The wheel 11 is journaled on the spindle 9, said wheel having a handle 12, or the said wheel may be provided with a suitable belt-pulley. The upright 1 is provided near its upper end with the arms 13, and on the inclined ends of said arms the pulley-wheels 14 are journaled. The endless belt 15 passes around the wheel 11, over the wheels 14 14, and around the pulley 6, and thus imparts a revolving motion to the shaft 3. By adjusting the perpendicular position of the wheel 11 (this may be done by loosening the thumb-nut 10 and retightening it again) the tension of the belt 15 may be regulated.

As before stated, the shaft 3 is hollow, and the dasher 16 is attached to the lower end of the said shaft 3, as shown in Fig. 2. Said dasher is preferably cylindrical, and the dasher is closed at its top and bottom, the outer surface of the top being slightly convexed. The perpendicular sides of the dasher are shaped as shown in Fig. 3. The said sides increase in thickness from the points 18 to the ends 19, and between the end 18 of one side 17 and the end 19 of the opposite side 17 there is a space 20, leading into the interior of the dasher. The dasher is preferably provided with two spaces 20. The tub 21 is suitably secured to the stationary surface, and on opposite sides, on the interior, the said tub 21 is provided with a perpendicular guide 22, the edges of the wings 23 adapted to pass perpendicularly between the guides 22, as shown in Fig. 3, the wings extending toward the center of the tub. The dasher 16 is adapted to revolve within the tub between the wings 23 23, and in so doing a current of air is caused to descend from the hollow shaft 3, and by means of the blunt ends 19 19 of the sides 17 the said air is forced beneath the surface of the cream.

The following chemical action takes place: The oxygen in the air is taken up by the hydrogen in the cream-forming peroxid of hydrogen, which immediately dissolves the albumen capsules incasing the butter globules, thus liberating the butter. The particles thus liberated being cohesive unite in crystals, forming flakes of butter.

Inasmuch as the hollow shaft 3 is journaled in and supported by the arm 2 above the receptacle containing the cream there is no journal-point below the surface of the cream. This is advantageous in that where a journal-point or point of friction is located beneath the surface of the cream the friction incidental to such point causes black specks. These specks become mixed with the butter.

The tub 21 is provided with a removable top, said top consisting of two semicircular sections 24 24. A perforated ear 25 is secured to the upper edge of the tub on opposite sides. Each section 24 is provided with a curved tongue 26, said tongue 26 being adapted to enter the perforation of the ear 25. The sections 24 are provided with suitable handles 27. Each section 24 is provided with a semicircular recess, in which is located a suitable bearing 28. When the sections 24 are in proper position, as shown in Fig. 2, the bearing 28 surrounds the shaft 3, and thus a bearing for the lower end of the shaft is made. It will be seen that when the sections 24 24 are closed, as shown in Fig. 2, the top of the tub 21 is practically closed and there is no inlet into the said tub except through the hollow shaft and dasher, as above described.

When the butter is churned, the sections 24 are removed from the top of the tub and the set-screw 7 is disengaged from the shaft 3, and thus the pulley 6 is permitted to descend on the shaft 3. The said shaft 3 and the dasher 16 can then be raised through the bearing in the arm 2 until the lower side of the dasher 16 is above the upper edge of the tub 21. The tub can then be removed and emptied.

Having described my invention, what I claim as new, and desire to secure by Letters Patent, is—

A churn consisting of a receptacle, a perpendicular shaft journaled above said receptacle, said shaft being hollow and forming an air-duct, a dasher fixed to the lower end of said shaft, said dasher being closed at its top and bottom and being hollow in its interior, said shaft entering the hollow interior of the dasher, the sections forming the perpendicular sides of the dasher being pointed at one end and being blunt at the opposite end, said sections gradually increasing in thickness from the pointed ends to the blunt ends, the total lengths of the sections being less than the circumference of the dasher, thereby leaving openings between the blunt ends of the sections and the sharp ends of the opposite sections, said sections being curved to conform to the circumference of the dasher.

In testimony whereof I affix my signature in presence of two witnesses.

GEORGE E. MOSER.

Witnesses:
C. J. McCULLOUGH,
H. C. BLADDER.